United States Patent Office.

MODENA HAT COMPANY, ASSIGNEES BY MESNE ASSIGNMENTS OF HENRY LOEWENBERG, OF NEW YORK, N. Y.

*Letters Patent No.* 45,568, *dated February* 28, 1865; *reissue No.* 2,587, *dated April* 30, 1867.

IMPROVED FABRIC FOR HATS, BONNETS, &c.

The Schedule referred to in these Letters Patent and making part of the same.

TO ALL WHOM IT MAY CONCERN:

Be it known that I, HENRY LOEWENBERG, of the city, county, and State of New York, have invented a new and useful Fabric, suitable for the Manufacture of Hats and Bonnets, Braidings, Trimmings, &c., and that the following is a full, clear, and exact description of the same.

My invention consists of a fabric having a foundation of interlaced threads, and a surface composed of fibrous material stiffened by gelatinous matter and consolidated by pressure.

In manufacturing my fabric I prefer to use cotton flannel, which consists of interlaced threads covered with a suitable fibrous material. I stiffen the material by saturating the cotton flannel with what I term "liquid silex," and by drying the saturated cloth. After the cloth is dry I subject it to pressure by the action of a die or dies placed in a suitable press. The material which I term "liquid silex" is the glutinous solution in water of the substance commonly called "soluble glass." I use the gelatinous solution either alone or mixed with coloring matter, so that both the dyeing of the fabric and the stiffening are effected by the same compound. By engraving, or otherwise preparing the die or dies in a suitable manner, any desirable appearance may be given to the surface of the fabric; also, the surface may be glazed with a varnish either before or after pressure.

In this fabric the cloth forms the foundation of interlaced threads which gives strength to the fabric. The fibrous material, when saturated with the gelatinous preparation, forms upon the thread foundation a pulpy layer, which is capable of receiving and retaining a highly-embossed surface; and the gelatinous matter causes the fibres of the fibrous material to adhere to each other and to retain the form in which they are compressed. The fabric, therefore, has the strength of the interlaced threads of the cloth, while the compressed fibrous material conceals the lines and indentations of the interlaced threads, and produces the same surface as would be obtained if the fabric were formed wholly of a stiffened pulpy material.

What I claim as my invention, and desire to secure by Letters Patent, is—

The new compound fabric, hereinbefore described, having substantially a foundation of interlaced threads, and a surface composed of fibrous material stiffened by gelatinous matter and consolidated by pressure.

In testimony whereof I have hereunto set my hand this twenty-third day of March, A. D. 1867.

HENRY LOEWENBERG.

Witnesses:

E. S. RENWICK,

CHAS. H. LEONARD.